(No Model.) 2 Sheets—Sheet 2.
P. SCHUH.
EXTENSION FIRE ESCAPE.
No. 268,947. Patented Dec. 12, 1882.
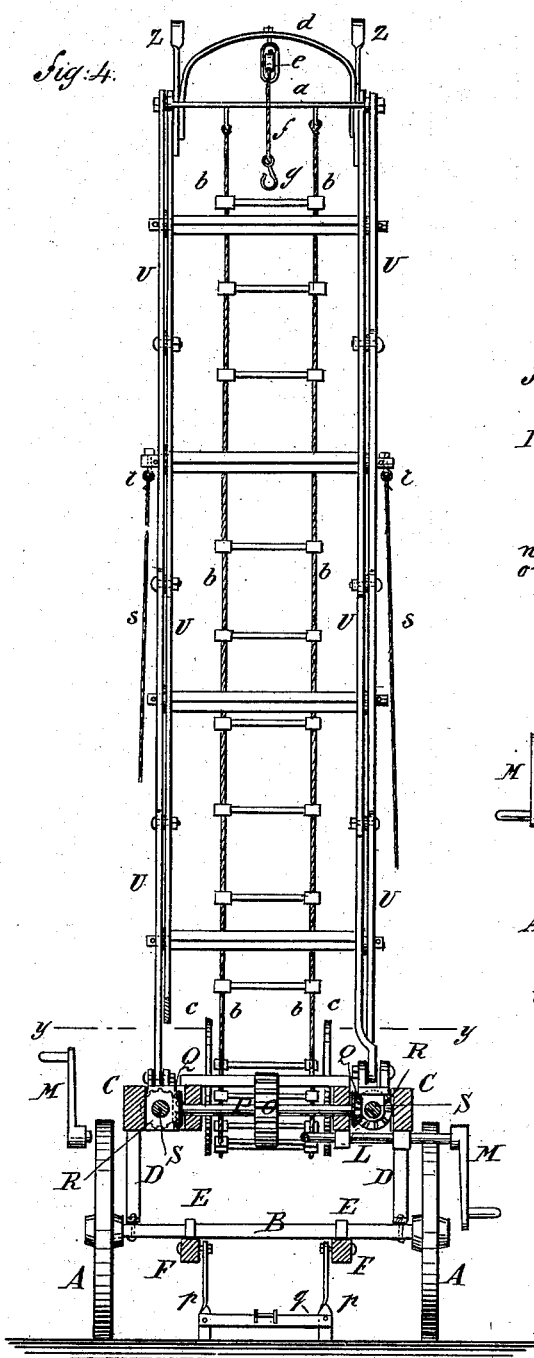
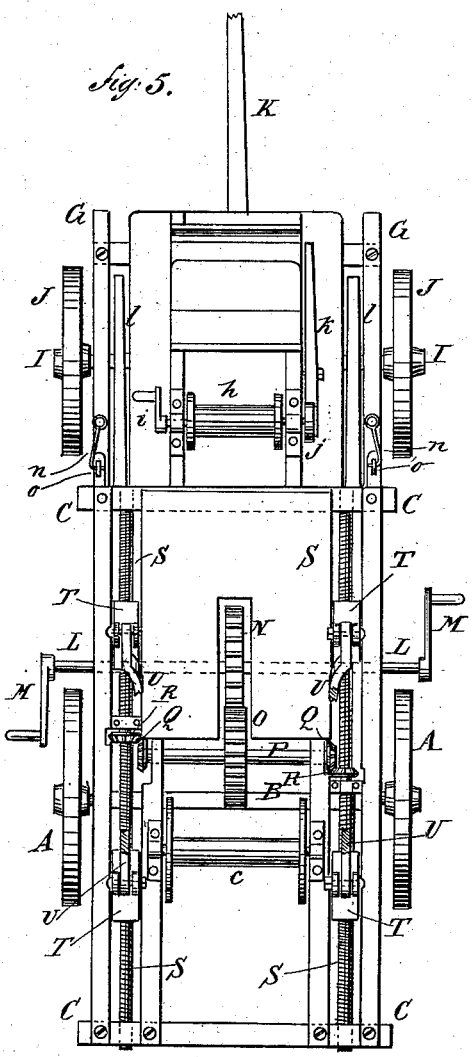
WITNESSES:
Chas. Nida
C. Sedgwick
INVENTOR:
P. Schuh
BY Munn & Co
ATTORNEYS.

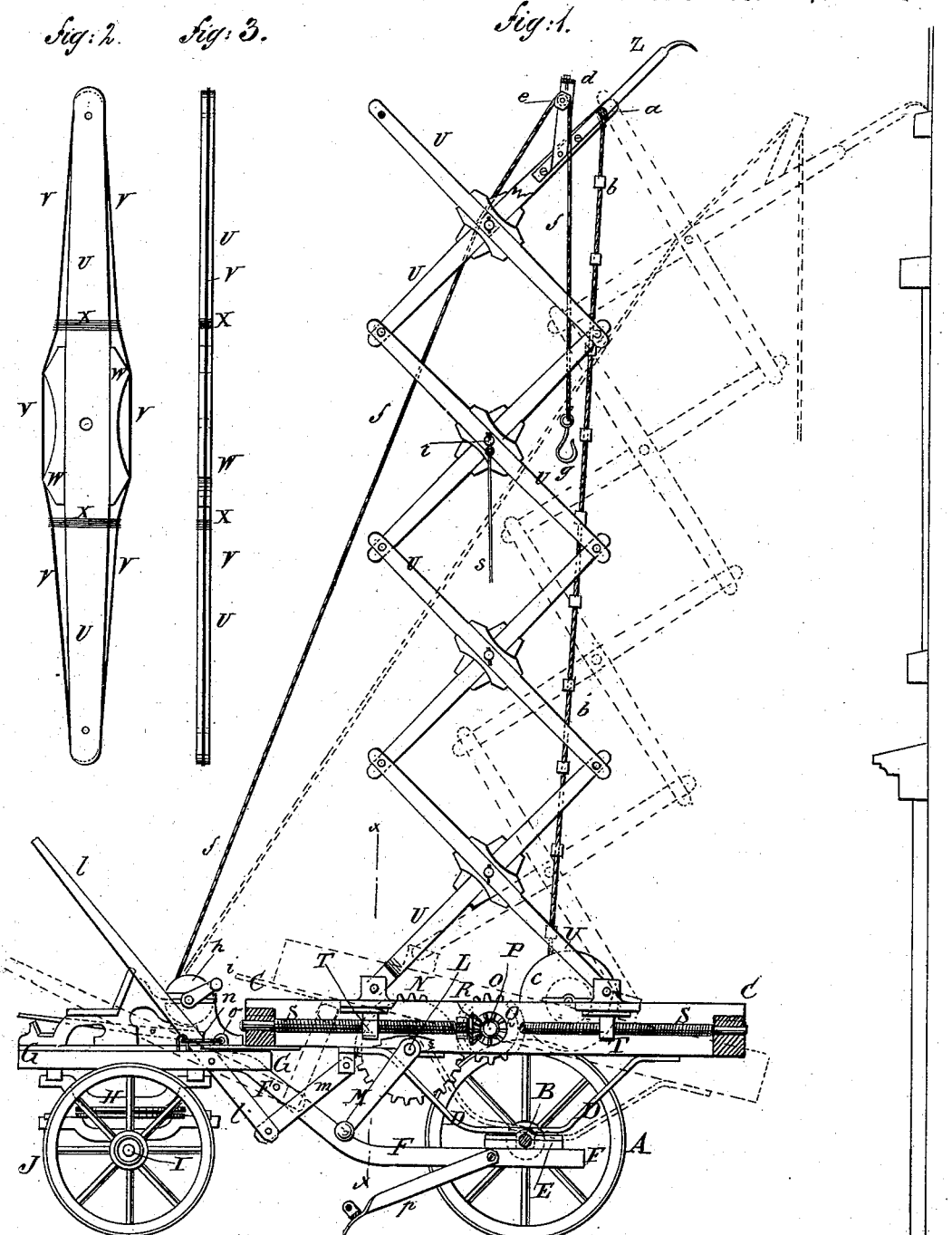

UNITED STATES PATENT OFFICE.

PHILIP SCHUH, OF WESTCHESTER, NEW YORK.

EXTENSION FIRE-ESCAPE.

SPECIFICATION forming part of Letters Patent No. 268,947, dated December 12, 1882.

Application filed May 27, 1882. (No model.)

*To all whom it may concern:*

Be it known that I, PHILIP SCHUH, of Westchester, in the county of Westchester and State of New York, have invented a new and useful Improvement in Extension Fire-Escapes, of which the following is a full, clear, and exact description.

Reference is to be had to the accompanying drawings, forming a part of this specification, in which similar letters of reference indicate corresponding parts in all the figures.

Figure 1, Sheet 1, is a side elevation of my improvement partially extended and partly in section. Fig. 2, Sheet 1, is a side elevation of one of the bars of the lazy-tongs. Fig. 3, Sheet 1, is an edge view of the same. Fig. 4, Sheet 2, is a front elevation of the improvement, partly in section, through the line $x$ $x$, Fig. 1. Fig. 5, Sheet 2, is a sectional plan view of the same, taken through the line $y$ $y$, Fig. 4.

The especial object of this invention is to facilitate the rescue of people from burning buildings.

The invention relates to an extension fire-escape constructed with a carriage having the rear part of its frame movable and its forward part stationary, the said parts being connected by levers and connecting-bars to allow the said movable frame to be readily adjusted and controlled. To the movable part of the carriage-frame are swiveled two right and left screws provided with a driving-gearing, and carrying two pairs of nuts, to which are hinged the lower bars of a lazy-tongs, so that the lazy-tongs can be raised and lowered by turning the said screws. With the lazy-tongs and carriage-frame are connected a flexible ladder and its reel, and a bail, pulley, rope, and reel, the said rope-reel having a brake-lever connected with it for controlling its movements. The carriage is also provided with dogs to engage with the ground and hold the carriage from moving forward while the machine is being used. The bars of the lazy-tongs are strengthened by truss-wires and truss-blocks, the said truss-wires being tightened and held in place by bands passed around them and the said bars, all constructed and operating as will be hereinafter fully described.

A represents the rear wheels of the machine, the axle B of which is connected with the rear frame, C, by the bars or brackets D. The middle parts of the bars D are rigidly attached to the axle B, and their end parts incline upward and are rigidly attached to the rear frame, C.

With the rear axle, B, are connected, by bearings E, the rear ends of the reaches F, which have an upward offset or inclination in their middle parts, and are attached at their forward ends to the forward frame, G. The forward frame, G, is connected by a fifth-wheel, H, with the axle I of the forward wheels, J. The reaches F are bolted to the cross-bars of the frame G, to which the fifth-wheel H is attached, so that they may be rigidly connected therewith. By this construction the carriage can be turned in small space.

The carriage is provided with a tongue, K, in the manner of an ordinary wagon.

In bearings attached to the side bars of the rear frame, C, revolves a shaft, L, the ends of which project, and have cranks M attached to them, by means of which the said shaft is operated.

To the middle part of the shaft L is attached a gear-wheel, N, the teeth of which mesh into the teeth of the gear-wheel O, attached to the shaft P. The shaft P revolves in bearings attached to the frame C, and to its ends are attached beveled-gear wheels Q, the teeth of which mesh into the teeth of beveled-gear wheels R, attached to the centers of the right-and-left screws S. The screws S extend along the inner sides of the side bars of the rear frame, C, and are swiveled to bearings attached to the said frame.

Upon the right and left screws S, upon the opposite sides of and equally distant from their centers, are placed nuts T, which have lugs formed upon their upper sides. To the lugs of the nuts T of each screw S are hinged the lower ends of the lower bars, U, of a lazy-tongs, which bars are pivoted to each other at their centers and ends in the ordinary manner. The bars U are strengthened by wires V, which pass around their ends and along their side edges, and are held out from the said edges by truss-blocks W, secured to the middle parts of the said side edges. The truss-wires V are drawn down toward the bars U, and tightened by wires X or other bands passed around the bars U and wires V near the ends of the blocks W. To the upper ends of the rear top bars, U, are attached arms Z, having their outer ends curved downward to form hooks to engage with a window-sill or some other part of the side of the building when the lazy-tongs is inclined against the said building.

The upper ends of the rear top bars, U, are connected by a round, a, to which is attached the upper end of a flexible ladder, b, which may be made of rope with wooden rounds, or of wire rope with metal rounds, as may be desired. The lower end of the ladder b is attached to a windlass or reel, c, secured to the rear part of the frame C, and provided with a crank, pilot-wheel, or other well-known means for turning the said reel to wind up the ladder. To the rear top bars, U, is attached a bail, d, to the center of which is swiveled the block of a pulley, e, over which passes a rope, f. To one end of the rope f is attached a hook, g, and its other end is attached to a reel, h, connected with the forward frame, G.

To one journal of the reel h is attached a crank, i, by means of which the said reel can be turned to wind up the rope f, and to control the unwinding of the said rope when lowering an object from the upper part of a building. To the other journal of the reel h is attached a friction-wheel, j, against the face of which rests a brake-lever, k. The lever k is pivoted to a support attached to the forward frame, G, and its free end projects into such a position that it can be conveniently reached and operated from the forward end of the machine to apply friction to the wheel j, and thus control the unwinding of the rope f.

To the forward frame, G, are pivoted two levers, l, the lower ends of which project beneath the said frame G, and to them are pivoted the ends of two connecting-bars, m. The other ends of the connecting-bars m are pivoted to the forward part of the rear frame, C, so that by operating the levers l the said rear frame can be turned to incline or tilt the lazy-tongs U against a building and raise it again into a vertical position. The frame C is secured in place when the lazy-tongs U are in a vertical position by hooks n, hinged to the frame G, and which hook into eyes o, attached to the frame C.

To the reaches F, near their rear ends, are hinged the upper ends of two dogs, p, to engage with the ground and prevent the carriage from moving forward when the machine is being used. The dogs p are connected by a round, q, and may be supported in place, when raised, by a strap, spring-catch, or other suitable means. With this construction the machine can be made light and strong, and can be easily and quickly operated.

To the ends of one of the upper central pivot-bars of the lazy-tongs U are attached eyebolts r, or other supports, to receive the upper ends of two brace or guy ropes, s, the lower ends of which are designed to be attached to windlasses or other supports secured to the side bars of the frame C to support the lazy-tongs when extended against the wind or other side strain, and thus make it more secure.

In using the apparatus it is drawn to the scene of the fire and arranged in position. The cranks M are then operated to raise the lazy-tongs, the hooks n are disengaged to disconnect the frames C and G, and the levers l are operated, tilting the frame C and the extended lazy-tongs gradually until the hook-arms Z engage with the building, as indicated in dotted lines in Fig. 1. The dogs p are then lowered to the ground and will hold the apparatus firmly from forward movement, so that the ladder b and the rope f can be safely used for the rescue of persons and goods from the building.

Having thus described my invention, I claim as new and desire to secure by Letters Patent—

1. The combination, with the frames C G, of the rear axle-connecting bars D, rigidly attached at the middle to said axle, and having their upwardly-inclined ends rigidly attached to rear frame, C, the middle inclined reaches, F, connected by bearings E with said axle, and at the front with the forward frame, G, and the front axle, I, connected by fifth-wheel with said frame G, whereby the carriage can be turned, as described.

2. The combination, with the frames C G, of the two levers l, projecting beneath the frame G, and the end-pivoted connecting-bars m, whereby the rear frame can be operated to tilt the lazy-tongs, as described.

3. In an extension fire-escape, the combination, with the bars U of the lazy-tongs, of the truss-wires V, the truss-blocks W, and the bands X, substantially as herein shown and described, whereby the said bars are greatly strengthened, as set forth.

PHILIP SCHUH.

Witnesses:
JAMES T. GRAHAM,
C. SEDGWICK.